UNITED STATES PATENT OFFICE.

FREDERICK SALATHÉ, OF JERSEY CITY, NEW JERSEY, ASSIGNOR, BY MESNE ASSIGNMENTS, TO THE LITHO-CARBON COMPANY, OF NEW YORK, N. Y.

COMPOSITION OF MATTER.

SPECIFICATION forming part of Letters Patent No. 452,763, dated May 19, 1891.

Application filed November 12, 1890. Serial No. 371,130. (No specimens.)

*To all whom it may concern:*

Be it known that I, FREDERICK SALATHÉ, of Jersey City, in the county of Hudson and State of New Jersey, have invented a new and useful Composition of Matter, of which the following is a specification.

My invention consists of a new composition of matter or material consisting, essentially, of fibrous material and a new hydrocarbon product of my own invention.

The nature and attributes of this new hydrocarbon product, as well as the process by which it is obtained, are fully set forth and claimed by me in my application for Letters Patent filed March 6, 1891, bearing Serial No. 383,942, on which Letters Patent issue of even date herewith, and to which reference is hereby made for more complete information. It is sufficient here to say that the said hydrocarbon product is a resinoid hydrocarbon of the $C_{10}H_{16}$ series, which has substantially the following analysis: carbon, 88.23; hydrogen, 11.59; oxygen, .06; sulphur, trace, the same being a solid material with a specific gravity of from 1 to 1.028, tough and of a glossy jet-black color, flexible and somewhat plastic at ordinary temperatures, soluble in naphtha, benzole, chloroform, bisulphide of carbon, partially in ether, completely in turpentine, rosin-oils, &c., capable of withstanding a temperature of 600° Fahrenheit and resisting alkalies and acids, excepting concentrated nitric and concentrated sulphuric acids. It is obtained from a natural substance, which, so far as I am at present informed, is found in the State of Texas only, but which, possibly, may exist in other localities, the treatment which I employ for obtaining this product consisting, essentially, in first separating the crude natural substance from the sand or shell rock in which it is found in nature by means of a solvent, then separating or driving off the solvent from the crude material thus obtained, and finally injecting steam or hot air into the said crude material in order to drive off the sulphur and volatile-oil constituents which are combined therewith, as well as to supply the said material with the oxygen, which is lacking in the natural substance, all as more fully set forth in my aforesaid application, Serial No. 383,942.

The material or composition of matter which is the subject of this application is composed, as above said, of this new hydrocarbon product and fibrous material.

The fibrous material may be of any suitable kind, vegetable or mineral—as, for example, wood or paper pulp, papier-maché, asbestus, amianthus, mineral wool or slag wool, or equivalent fibrous or absorbent material, and it may be combined, either prior or subsequent to its being molded or shaped, into definite form with the hydrocarbon product. The composition of matter thus produced is susceptible of use for the manufacture of water-pipes, toys, photographic trays, cardboard, for roofing and building purposes, and also generally for the manufacture of the class of articles heretofore made of papier-maché or other plastic compositions. It can also be used as a substitute for hard rubber or vulcanite, being a good insulator and non-conductor, and it is susceptible of being turned in a lathe and of receiving a high degree of polish.

In some cases—as, for example, in making the hard rubber substitute—I prefer to more highly oxidize the hydrocarbon product prior to its mixture with the fiber. This can readily be accomplished by heating the product in a steam-jacketed vessel and blowing heated air through it until the desired degree of oxidation is effected, and to facilitate this oxidizing action some agent—such as peroxide of manganese or litharge—can be added in powdered form to the molten mass. This oxidizing agent will finally settle to the bottom and can be strained or otherwise taken off.

In practicing my invention I proceed as follows: If it is desired to mix the fiber or pulp and the hydrocarbon product together prior to putting the fibrous material into shape, the hydrocarbon product, with or without a solvent, is heated in a suitable vessel to a temperature of, say, from 170° to 350° Fahrenheit, or sufficient to bring it to molten condition. The fibrous material or pulp is then added in proper proportion. I find that, say, from twenty to twenty-five parts, by weight, of the hydrocarbon product with from twenty-five to eighty parts of wood pulp, paper-pulp, or the like will give good results. The substances are thoroughly and intimately mixed and a plastic composition thus obtained, which may be molded or pressed into the desired shapes for ornament or use. The composition of course hardens by cooling, and the hardness, strength, and elasticity of the shaped articles depend largely upon the proportion of the hydrocarbon product employed, and to some extent upon the degree of pressure to which the composition is subjected in the mold. If it be desired to combine the hydrocarbon product with fibrous pulp or material after the latter is in the form of a shaped article, the hydrocarbon, as before, is brought to molten condition, and then the formed article of fibrous material (which to secure the best results should first be carefully dried in an oven or by other suitable means) is immersed or dipped into the molten hydrocarbon. The immersion or dipping should continue until bubbles cease to rise from the liquid or semi-liquid hydrocarbon. The articles thus thoroughly impregnated are withdrawn from the bath, and then are subjected to a temperature of, say, 220° Fahrenheit or upward to insure the uniform and thorough penetration and impregnation of the fibrous material by the hydrocarbon product. They are exposed to this heat for a suitable length of time—from, say, ten to fifteen minutes or more, according to the size of the articles and their porosity. They are then removed and allowed to cool, the result being that the formed article consists of the hereinbefore-specified composition of fiber and hydrocarbon product, which composition will be found to be hard, tough, somewhat elastic, very firm and strong, having many of the properties of and closely resembling in appearance vulcanite, or "hard rubber" so called.

Having now described my invention, what I claim herein as new, and desire to secure by Letters Patent, is—

The composition of matter consisting, essentially, of pulp or fibrous material and the herein-described hydrocarbon product, substantially as hereinbefore set forth.

FREDERICK SALATHÉ.

Witnesses:
CHARLES TAYLOR,
JOHN C. DICKINSON.